United States Patent
Abedini et al.

(10) Patent No.: US 10,904,924 B2
(45) Date of Patent: Jan. 26, 2021

(54) NR RACH MSG1 CONFIGURATION FOR CV2X

(71) Applicant: QUALCOMM Incorporated, San Diego, CA (US)

(72) Inventors: Navid Abedini, Somerset, NJ (US); Zhibin Wu, Sunnyvale, CA (US); Sudhir Kumar Baghel, Hillsborough, NJ (US); Junyi Li, Chester, NJ (US); Kapil Gulati, Dover, DE (US); Libin Jiang, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/279,517

(22) Filed: Feb. 19, 2019

(65) Prior Publication Data
US 2019/0268945 A1 Aug. 29, 2019

Related U.S. Application Data

(60) Provisional application No. 62/634,533, filed on Feb. 23, 2018.

(51) Int. Cl.
*H04W 74/08* (2009.01)
*H04W 4/40* (2018.01)
*H04W 72/04* (2009.01)
*H04W 8/00* (2009.01)
(Continued)

(52) U.S. Cl.
CPC ......... *H04W 74/0833* (2013.01); *H04W 4/40* (2018.02); *H04W 8/005* (2013.01); *H04W 72/0446* (2013.01); *H04W 76/11* (2018.02); *H04W 74/008* (2013.01)

(58) Field of Classification Search
CPC ............... H04W 74/0833; H04W 4/40; H04W 72/0446; H04W 8/005; H04W 76/11; H04W 74/008
See application file for complete search history.

(56) References Cited

U.S. PATENT DOCUMENTS

| | | | |
|---|---|---|---|
| 2010/0278131 A1* | 11/2010 | Jeong | H04W 74/0833 370/329 |
| 2013/0157670 A1* | 6/2013 | Koskela | H04W 76/14 455/450 |
| 2014/0307611 A1 | 10/2014 | Tesanovic et al. | |

(Continued)

OTHER PUBLICATIONS

Kaiser et al.: Efficient Privacy Preserving Multicast DNS Service Discovery; Aug. 22, 2014; IEEE Xplorer; published 2014.*
(Continued)

*Primary Examiner* — Jay P Patel
(74) *Attorney, Agent, or Firm* — Arent Fox LLP

(57) ABSTRACT

Methods, apparatuses, and computer-readable mediums for wireless communication are disclosed by the present disclosure. In an example, the present disclosure includes selecting, at a first device, a Random Access Channel (RACH) preamble identifier (ID) from a set of RACH preamble IDs based on a discovery procedure associated with a second device, wherein each RACH preamble ID from the set of RACH preamble IDs corresponds to at least one RACH preamble and is associated with the second device; and transmitting, from the first device, a RACH preamble associated with the selected RACH preamble ID to the second device.

30 Claims, 7 Drawing Sheets

(51) Int. Cl.
    *H04W 76/11*    (2018.01)
    *H04W 74/00*    (2009.01)

(56)  References Cited

U.S. PATENT DOCUMENTS

| | | | |
|---|---|---|---|
| 2015/0023281 A1* | 1/2015 | Wu | H04W 72/0473 |
| | | | 370/329 |
| 2015/0071189 A1* | 3/2015 | Park | H04W 8/005 |
| | | | 370/329 |
| 2015/0373626 A1* | 12/2015 | Yi | H04W 48/12 |
| | | | 375/132 |
| 2016/0007406 A1* | 1/2016 | Yi | H04W 76/28 |
| | | | 370/252 |
| 2016/0234759 A1* | 8/2016 | Kubota | H04W 48/14 |
| 2016/0242132 A1* | 8/2016 | Bae | H04W 56/0005 |
| 2017/0231011 A1* | 8/2017 | Park | H04W 72/0446 |
| 2018/0077676 A1* | 3/2018 | Kaloxylos | H04W 84/20 |
| 2018/0077730 A1* | 3/2018 | Kim | H04W 74/0833 |
| 2018/0092129 A1* | 3/2018 | Guo | H04W 56/001 |
| 2018/0167979 A1* | 6/2018 | Guo | H04W 74/0833 |
| 2019/0191315 A1* | 6/2019 | Mukherjee | H04W 72/085 |
| 2019/0327764 A1* | 10/2019 | Yoo | H04W 72/044 |

OTHER PUBLICATIONS

International Search Report and Written Opinion—PCT/US2019/018790—ISA/EPO—dated May 13, 2019.

\* cited by examiner

NR RACH MSG1 CONFIGURATION FOR CV2X

CLAIM OF PRIORITY

The present Application for Patent claims priority to U.S. Application No. 62/634,533 entitled "NR RACH MSG1 CONFIGURATION FOR CV2X" filed Feb. 23, 2018, which is assigned to the assignee hereof and hereby expressly incorporated by reference herein.

BACKGROUND

Technical Field

The present disclosure relates generally to communication systems, and more particularly, techniques for cellular vehicle-to-everything (CV2X) in 5G New Radio (NR).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For example, CV2X communications may include devices discovering and communicating with other nearby devices. Accessing techniques used with various frequency bands in NR may complicate existing access procedures. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, the present disclosure includes a method of wireless communications. The described aspects include selecting, at a first device, a Random Access Channel (RACH) preamble identifier (ID) from a set of RACH preamble IDs based on a discovery procedure associated with a second device, wherein each RACH preamble ID from the set of RACH preamble IDs corresponds to at least one RACH preamble and is associated with the second device. The described aspects include transmitting, from the first device, a RACH preamble associated with the selected RACH preamble ID to the second device.

In an aspect, an apparatus for wireless communications may include a memory; and at least one processor coupled with the memory. The processor may be configured to select, at a first device, a RACH preamble ID from a set of RACH preamble IDs based on a discovery procedure associated with a second device, wherein each RACH preamble ID from the set of RACH preamble IDs corresponds to at least one RACH preamble and is associated with the second device. The described aspects transmit, from the first device, a RACH preamble associated with the selected RACH preamble ID to the second device.

In an aspect, an apparatus for wireless communications is described. The described aspects include means for selecting, at a first device, a RACH preamble ID from a set of RACH preamble IDs based on a discovery procedure associated with a second device, wherein each RACH preamble ID from the set of RACH preamble IDs corresponds to at least one RACH preamble and is associated with the second device. The described aspects include means for transmitting, from the first device, a RACH preamble associated with the selected RACH preamble ID to the second device.

In an aspect, a computer-readable medium storing computer code executable by a processor for CV2X communications. The described aspects include one or more codes executable to select, at a first device, a RACH preamble ID from a set of RACH preamble IDs based on a discovery procedure associated with a second device, wherein each RACH preamble ID from the set of RACH preamble IDs corresponds to at least one RACH preamble and is associated with the second device. The described aspects transmit, from the first device, a RACH preamble associated with the selected RACH preamble ID to the second device.

In accordance with an aspect, a method of wireless communications is described. The described aspects include determining, at a second device, a set of RACH preamble IDs associated with the second device, wherein each RACH preamble ID from the set of RACH preamble IDs corresponds to at least one RACH preamble. The described aspects include establishing, at the second device, at least one indication corresponding to the set of RACH preamble IDs associated with the second device. The described aspects include receiving, at the second device, a RACH preamble from a first device based on the at least one indication, the RACH preamble being associated with a selected RACH preamble ID from the set of RACH preamble IDs.

In an aspect, an apparatus for wireless communications may include a memory; and at least one processor coupled with the memory. The processor may be configured to determine, at a second device, a set of RACH preamble IDs associated with the second device, wherein each RACH preamble ID from the set of RACH preamble IDs corresponds to at least one RACH preamble. The described aspects establish, at the second device, at least one indication corresponding to the set of RACH preamble IDs associated with the second device. The described aspects receive, at the second device, a RACH preamble from a first device based on the at least one indication, the RACH preamble being associated with a selected RACH preamble ID from the set of RACH preamble IDs.

In an aspect, an apparatus for wireless communications is described. The described aspects include means for determining, at a second device, a set of RACH preamble IDs associated with the second device, wherein each RACH preamble ID from the set of RACH preamble IDs corresponds to at least one RACH preamble. The described aspects include means for establishing, at the second device, at least one indication corresponding to the set of RACH preamble IDs associated with the second device. The described aspects include means for receiving, at the second device, a RACH preamble from a first device based on the at least one indication, the RACH preamble being associated with a selected RACH preamble ID from the set of RACH preamble IDs.

In an aspect, a computer-readable medium storing computer code executable by a processor for wireless communications. The described aspects include one or more codes executable to determine, at a second device, a set of RACH preamble IDs associated with the second device, wherein each RACH preamble ID from the set of RACH preamble IDs corresponds to at least one RACH preamble. The described aspects establish, at the second device, at least one indication corresponding to the set of RACH preamble IDs associated with the second device. The described aspects receive, at the second device, a RACH preamble from a first device based on the at least one indication, the RACH preamble being associated with a selected RACH preamble ID from the set of RACH preamble IDs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
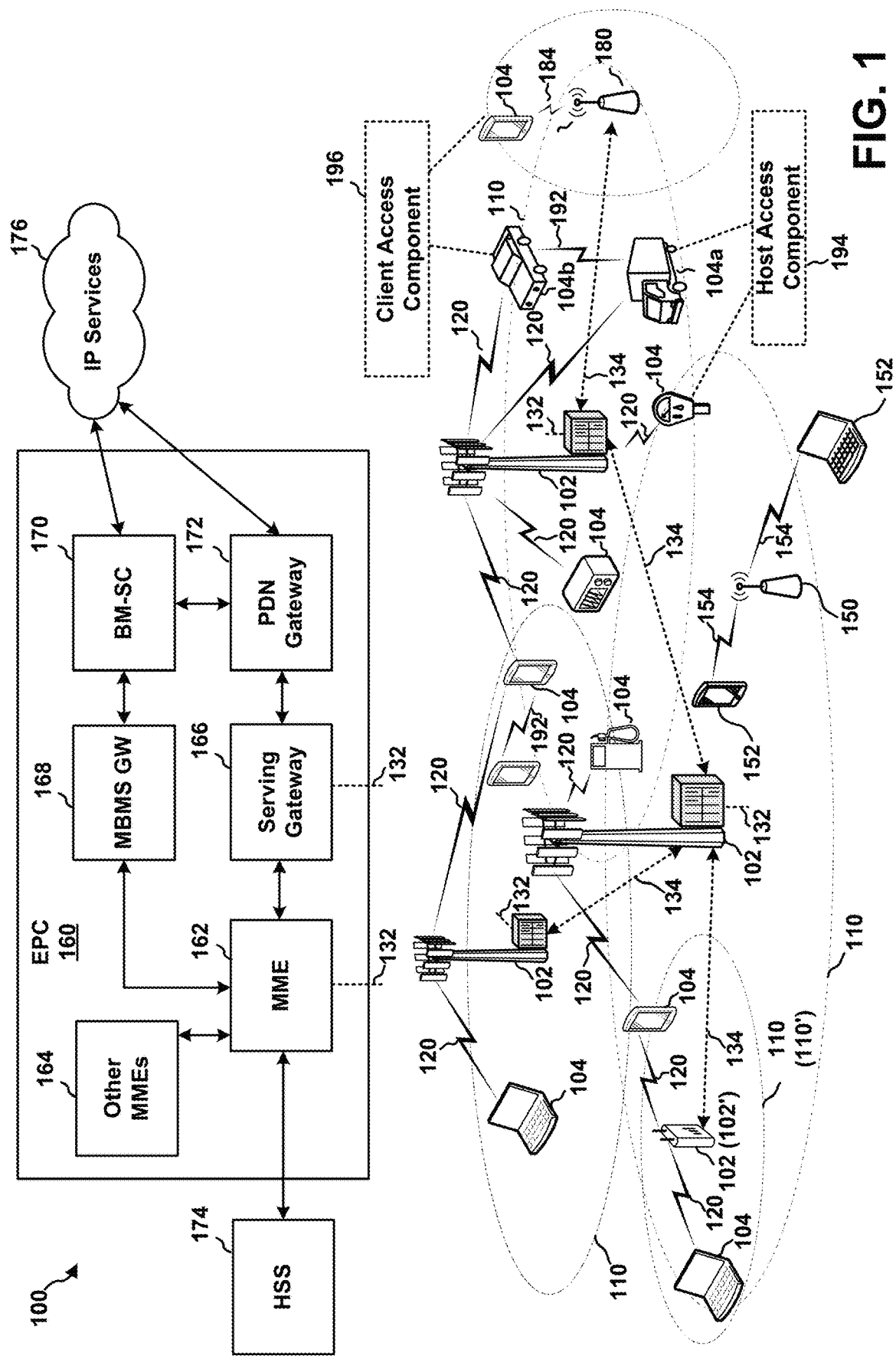
FIG. 1 is a block diagram illustrating an example of a wireless communications system and an access network.

Methods, apparatuses, and computer-readable mediums for wireless communication are disclosed by the present disclosure. In an example, a host device may advertise a service and a client device may indicate interest in the service and initiate a connection with the host device using the preconfigured discovery resources. As used herein, the term "preconfigured resources" means that the resources are configured for use as discovery resources prior to any communication between the host device and the client device. For example, the preconfigured resources may be configured in a regulation, standards document, and/or in system information transmitted by a base station. In particular, a discovery procedure may occur between the host device and the client device in order to establish the connection, and may include a discovery preamble transmitted by the host device and a query transmitted by the interested client device. Subsequently, the host device may transmit a discovery message only if the host device receives a query in response to the discovery preamble.

Accordingly, upon successful completion of the discovery procedure, the client device "discovers" the host device, and may decide to initiate an access procedure with the host device by transmitting a Random Access Channel (RACH) preamble. Typically, the client device may choose from a plurality of candidate RACH preambles (each with their own respective RACH preamble identifiers (IDs)). In an example, the choice may be random to reduce the chance of collision. Furthermore, the selected RACH preamble ID may include information corresponding to at least one of a size of subsequent RACH messages and/or an indication related to the resources where the client device discovered the host device (e.g., SSB index in NR access). In other instances, the set of candidate RACH preamble IDs may be indicated to the client device in earlier signaling (e.g., in SIB/RMSI in an access network).

In an aspect, the present disclosure provides example configurations of selecting and transmitting the RACH preamble and techniques for reducing the overhead associated with the access procedure. Multiple discovery devices (e.g., the host devices) may be active within the same set of resources, and, as such, coordination is needed to reduce the likelihood of collisions. Further, the client device may need to include additional information (e.g., related to the scheduling and/or available resources of the client device) in the RACH preamble.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. Although an EPC 160 is illustrated, the wireless communications system may include a different core network, such as a 5G Core (5GC). The base stations 102 may include macro cells (high power cellular base station) and/or small cell base stations (low power cellular base station). The UEs 104 may include one or more host UEs 104a that advertise services on the preconfigured discovery resources and one or more client UE 104b that respond to the one or more host UEs 104a.

The base stations 102 (collectively referred to as Evolved Universal Mobile Telecommunications System (UMTS) Terrestrial Radio Access Network (E-UTRAN)) interface with the EPC 160 and/or 5G core (5GC) through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 and/or 5GC) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell base station 102' may have a coverage area 110' that overlaps the coverage area 110 of one or more macro cell base stations 102. A network that includes both small cell base stations and macro cell base stations may be known as a heterogeneous network. A heterogeneous network may also include Home Evolved Node Base Stations (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ NR and use the same 5 GHz unlicensed frequency spectrum as used by the Wi-Fi AP 150. The small cell base station 102', employing NR in an unlicensed frequency spectrum, may boost coverage to and/or increase capacity of the access network.

A gNodeB (gNB) 180 and/or one or more UEs 104 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. In an aspect, a gNB 180 operating using mmW may utilize beamforming 184 with the UE 104 to compensate for the extremely high path loss and short range. Additionally, UEs 104 performing D2D communications may operate using mmW and may also utilize beamforming 184.

The EPC 160 and/or 5GC may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160 and/or 5GC. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 and/or 5GC for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain aspects, one or more UEs 104 may be configured for CV2X communications between UEs 104. The UEs 104 may include various devices related to vehicles and transportation. For example, the UEs 104 may include vehicles, devices within vehicles, and transportation infrastructure such as roadside devices, tolling stations, fuel supplies, or any other device that that may communicate with a vehicle. A UE 104 may act as either a host device or a client device for CV2X communication. A host UE 104a may include a host access component 194 for advertising CV2X services supported by the host UE 104. A client UE 104b may include a client access component 196 for discovering CV2X services supported by the host UE 104a and initiating an access procedure with the host UE 104. Moreover, a UE 104 may act as both a host and a client. For example, a vehicle may act as a host to provide speed and braking updates to surrounding vehicles and act as a client to communicate with a tolling station. Accordingly, a single UE 104 may include both a host access component 194 and a client access component 196. Further details of the host access component 194 and the client access component 196 are illustrated in FIG. 6 and FIG. 7.

Figure 6:
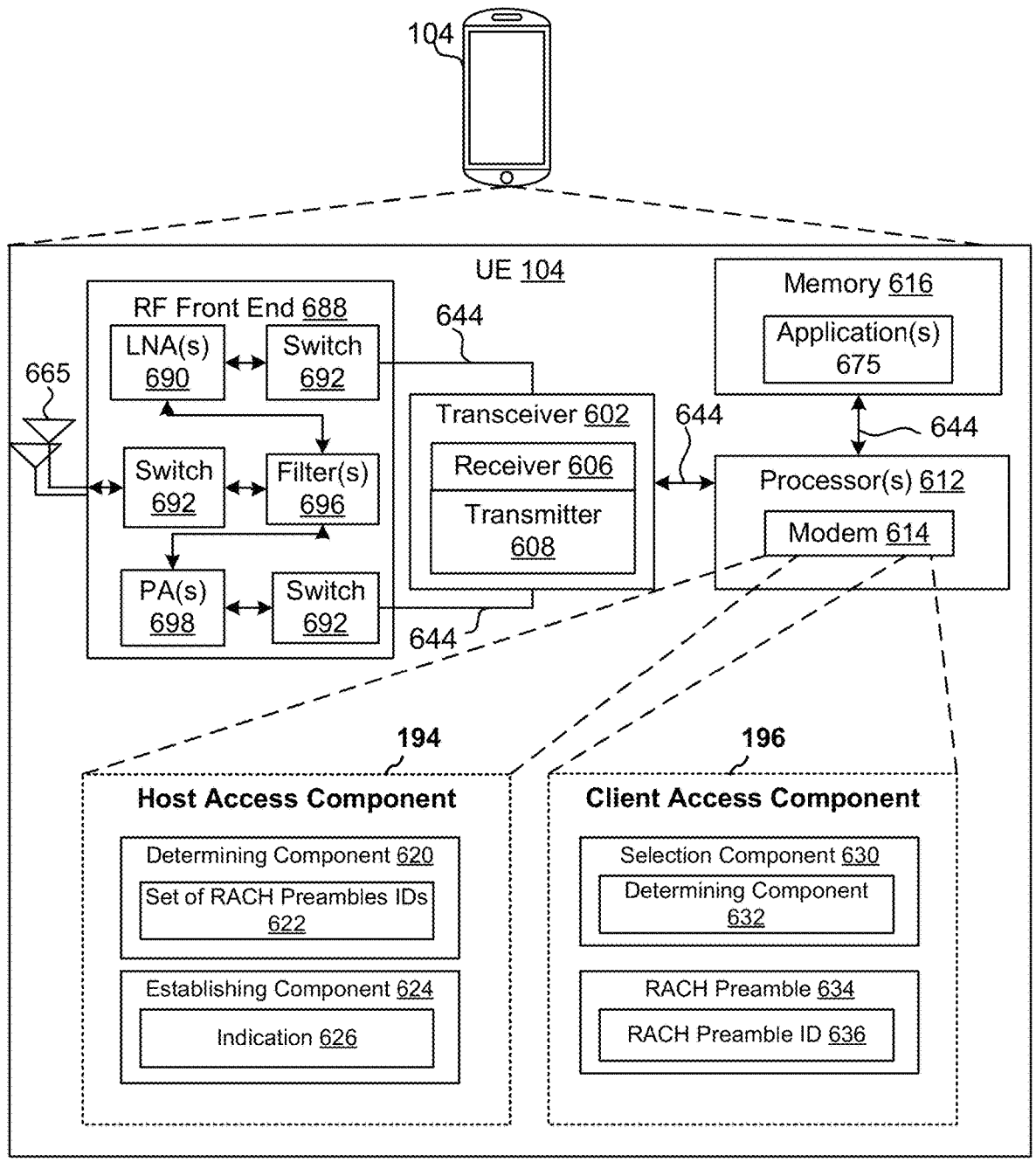
FIG. 6 is a schematic diagram of example components of the UE of FIG. 1.
Figure 7:
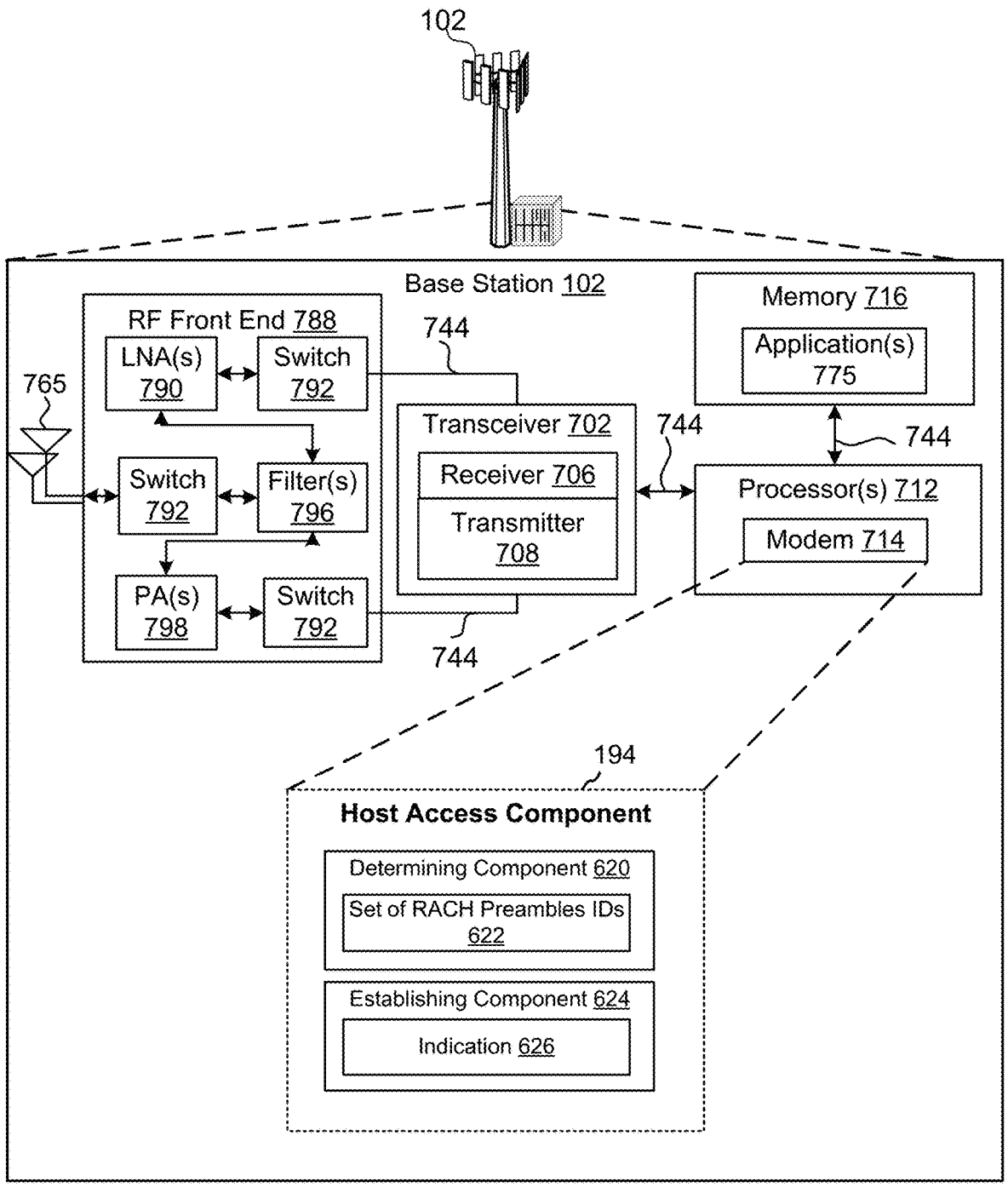
FIG. 7 is a schematic diagram of example components of the base station of FIG. 1.

Referring to FIG. 6 and FIG. 7, the host access component 194 may include a determining component 620 for determining a set of RACH preamble IDs 622 associated with the host UE 104a. For example, each RACH preamble ID from the set of RACH preamble IDs 622 corresponds to at least one RACH preamble. The host access component 194 may include an establishing component 624 for establishing at least one indication 626 corresponding to the set of RACH preamble IDs 622 associated with the host UE 104a.

In an aspect, the host UE 104a and/or the host access component 194 may configure the transceiver 602 and/or antenna(s) 665 to receive a RACH preamble 634 from the client device 104b based on the at least one indication 626. For example, the RACH preamble 634 may be associated with a selected RACH preamble ID 634 from the set of RACH preamble IDs 622. As described further herein, the at least one indication 626 may be either explicit or implicit.

In an aspect, the client access component 196, shown in FIG. 6, may include a selection component 630 and a determining component 632. For example, the selection component 630 may select a RACH preamble ID 636 from a set of RACH preamble IDs 622 based on a discovery procedure associated with the host device 104a. Each RACH preamble ID from the set of RACH preamble IDs 622 may correspond to at least one RACH preamble and is associated with the host UE 104a.

In an aspect, the client UE 104b and/or the client access component 194 may configure the transceiver 602 and/or antenna(s) 665 to transmit a RACH preamble 634 associated with the selected RACH preamble ID 636 to the host UE 104a.

In mmW communication systems (e.g., access network 100), a line of sight (LOS) may be needed between a transmitting device (e.g., base station 102) and a receiving device (e.g., UE 104), or between two UEs 104. Frequency is very high in mmW communication systems which means that beam widths are very small, as the beam widths are inversely proportional to the frequency of the waves or carriers transmitted by an antenna of the transmitting device. Beam widths used in mmW communications are often termed as "pencil beams." The small wavelengths may result in many objects or materials acting as obstacles including even oxygen molecules. Therefore, LOS between the transmitter and receiver may be required unless a reflected path is strong enough to transmit data. Further, in some examples, base stations may track UEs 104 to focus beams for communication.

During LOS situations, tracking of the UE 104 may be performed by the base station 102 or another UE 104 by focusing a beam onto the tracked UE 104. However, if the receiving UE 104 is in a Non-Line of Sight (NLOS) position, then a transmitter of the base station 102 may need to search for a strong reflected path which is not always available. An example of a UE 104 being in a NLOS position may include a first UE 104 located within a vehicle. When the first UE 104 is located within the vehicle, a base station 102 may have difficulty retaining LOS and the difficulty of retaining LOS may further increase when the vehicle is moving.

Further, compared to lower frequency communication systems, a distance between base stations 102 in a mmW communication system may be very short (e.g., 150-200 meters between gNBs). The short distances may result in a short amount of time required for a first handover between base stations 102. The short distance and the fast handovers may cause difficulty to the base station 102 in maintaining a LOS beam on a UE 104 when the UE 104 is, for example, located within a vehicle as even small obstacles like a user's finger on the UE 104 or the vehicle windows or windshield may act as obstacles to maintaining the LOS.

Figure 2:
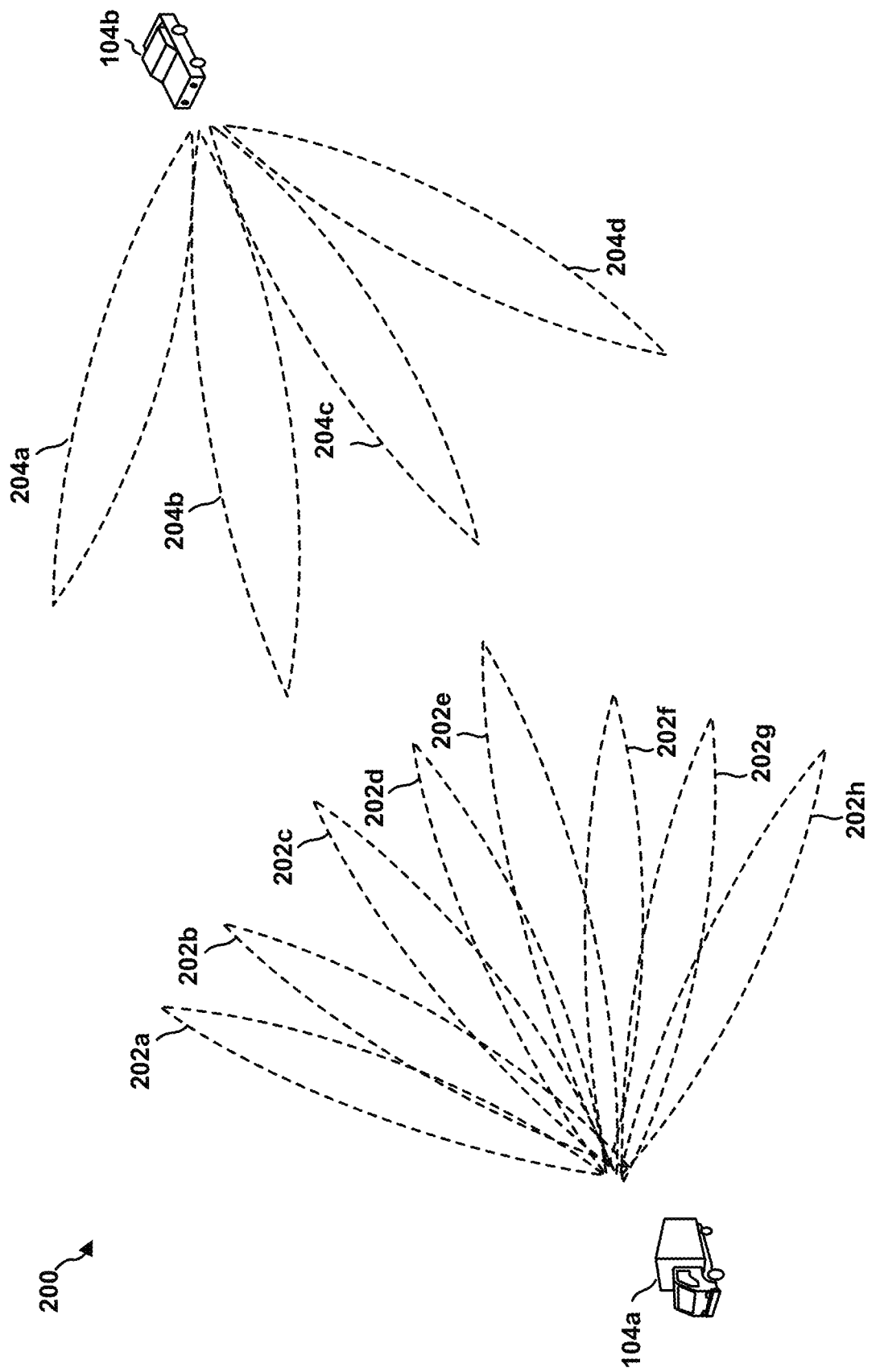
FIG. 2 is a block diagram of example UEs communicating using beamforming.

FIG. 2 is a diagram 200 illustrating a host UE 104a in communication with a client UE 104b. Referring to FIG. 2, the host UE 104a may transmit one or more beams 202a, 202b, 202c, 202d, 202e, 202f, 202g, and/or 202h to the client UE 104b, where the beams may be in one or more directions. The client UE 104b may receive the one or more beams 202a-202h in the same direction as transmitted by the Host UE 104a or in another direction due to reflection. The client UE 104b may also transmit one or more beams 204a, 204b, 204c, and/or 204d to the host UE 104a, where the beams may be in one or more directions. The host UE 104a may receive the one or more beams 204a-204d in the same direction as transmitted by the client UE 104b or in another direction due to reflection. The host UE 104a and/or the client UE 104b may perform beam training to determine the best beams for each of the host UE 104a/the client UE 104b to transmit/receive. For example, by providing feedback regarding a stronger beam.

The use of beamforming may impact discovery signals for CV2X communication. In some conventional D2D systems, discovery signals are broadcast by a host device to allow other devices to discover services offered by the host device. When beamforming is used to transmit a discovery signal, devices that are not positioned directly within the beam may not receive the signal. In an aspect, multiple transmissions of a discovery signal may be used to perform beam sweeping by transmitting the discovery signal in different directions. The multiple transmissions, however, may increase resource usage for the discovery signal.

Figure 3:
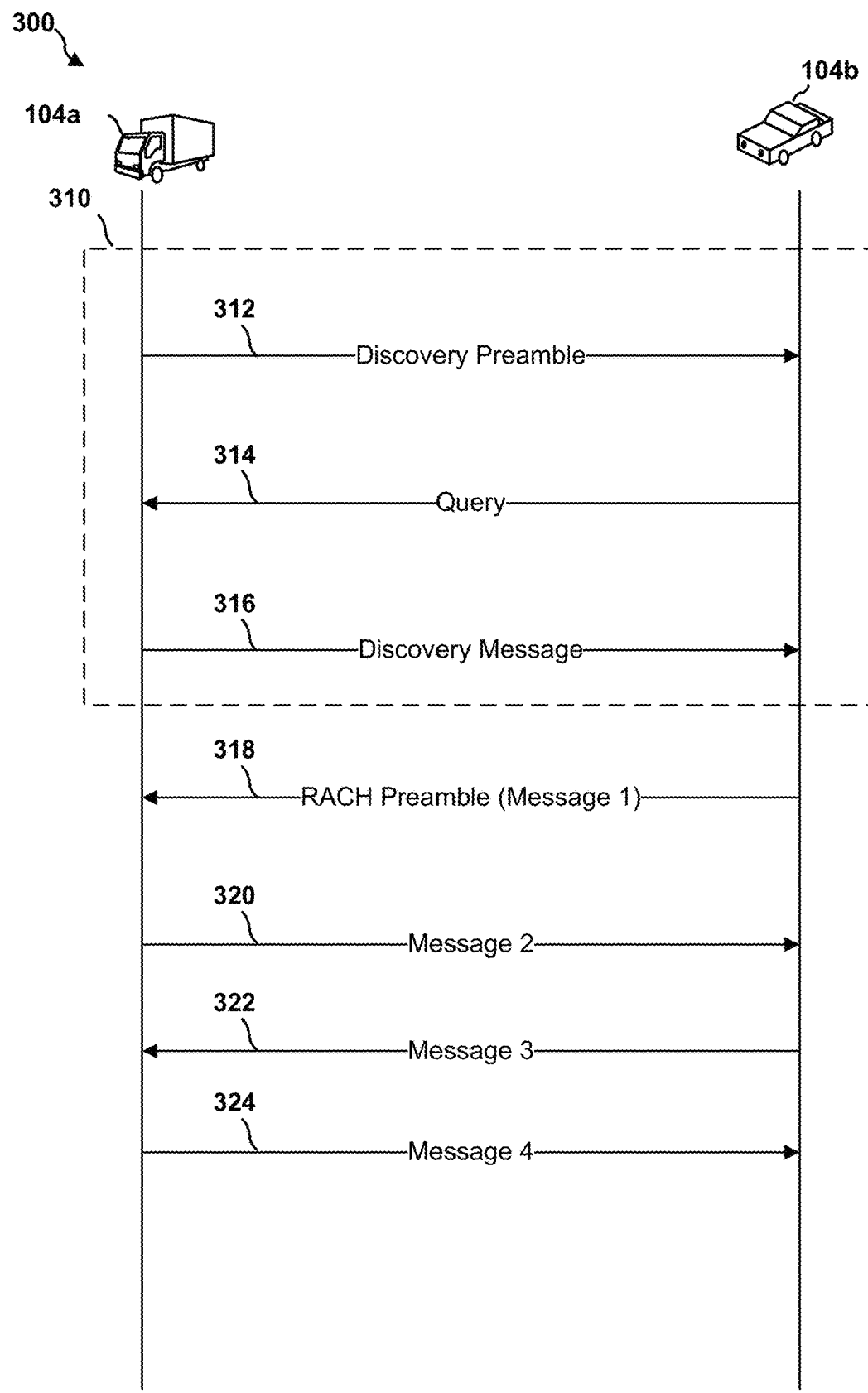
FIG. 3 is a message diagram showing an example of discovery and connection setup between UEs.

FIG. 3 is a message diagram 300 illustrating example signals that may be used for discovery and connection establishment between the host UE 104a and the client UE 104b. Although the illustrated example shows a host UE 104a, in an aspect, a base station 102 may be a shot and perform the actions of a host UE 104a as described below. In an aspect, one or more discovery signals may utilize preconfigured discovery resources 310. In a CV2X system, a host (e.g., base station 102 or host UE 104a) may not have information regarding the other UEs 104 with which the host UE 104a may want to communicate. By using the preconfigured discovery resources 310, the UEs 104 may limit a search space for discovering other UEs 104 and reduce overhead associated with discovery signals. Further, the discovery signals may reduce overhead by limiting discovery signal transmission unless a host UE 104 receives an indication that a device (e.g., a client UE 104b) is present that is interested in receiving the discovery signal. The discovery signals utilizing the preconfigured discovery resource 310 may include a discovery preamble 312, a query 314, and a discovery message 316.

The discovery preamble 312 may be a transmission from a host UE 104a indicating that the host UE 104a is capable of communicating (e.g., offering a service). For example, the discovery preamble 312 may be one predefined sequence selected from a set of predefined sequences. The selection of the predefined sequence may convey a limited amount of information. For example, the discovery preamble 312 may be selected based on a type of the host UE 104a or a type of service offered by the host UE 104a. As discussed in further detail below, the host UE 104a may transmit the discovery preamble 312 using discovery preamble resources within the preconfigured discovery resources 310. The host UE 104a may select which beams to use for the discovery preamble to attempt to reach potentially interested devices (e.g., one or more client UEs 104b).

The query 314 may be a transmission from a client UE 104b indicating that the client UE 104b is interested in obtaining further information from the host UE 104a. For example, the query 314 may be a preamble or other defined sequence transmitted by the client UE 104b on query resources corresponding to the discovery preamble resources. The client UE 104b may transmit the query 314 on the corresponding query resources upon receiving a discovery preamble in which the client UE 104b is interested. For example, the client UE 104b may transmit the query 314 in response to one or more preambles indicating certain types of devices or services. The client UE 104b may use beamforming for the query 314 based on the received discovery preamble 312 (e.g., using channel estimation and beam training). The host UE 104a may listen for queries 314 on the corresponding query resources.

The discovery message 316 may be a transmission from the host UE 104a providing information regarding one or more services offered by the host UE 104a. The host UE 104a may transmit the discovery message 316 in response to receiving the query 314. The discovery message 316 may include more information than the discovery preamble 312 and may be transmitted using beamforming based on the query 314. For example, the discovery message 316 may include details regarding the service offered by the host UE 104a. By transmitting the larger portion of the discovery information in the discovery message 316 only in response to the query 314, the host UE 104a may limit the discovery resources used. In an aspect, resources designated for transmission of a discovery message 316 may be repurposed (e.g., used for data for an existing connection) when the discovery message 316 is not transmitted. Additionally, since beamforming of the discovery message 316 may be based on the query 314, the host UE 104a may avoid repetitions of the discovery message 316 on multiple beams, further reducing the resources used for discovery.

The RACH preamble 318 may be a transmission from the client UE 104b seeking to establish communications with the host UE 104a. The RACH preamble 318 may also be referred to as a RACH message 1 and may perform as similar role as a conventional RACH message 1. The RACH preamble 318, however, may be transmitted on the preconfigured discovery resources 310 rather than a dedicated RACH physical channel. As discussed in further detail below, the resources defined for the RACH preamble 318 may also be repurposed when the RACH preamble 318 is not transmitted.

The host UE 104a and client UE 104b may complete a RACH procedure (i.e., an access procedure) based on information obtained from the discovery procedure discussed above. Alternatively, a CV2X RACH procedure may follow other discovery procedures. The RACH procedure may include the RACH preamble 318 (RACH Message 1), RACH message 2 320, RACH message 3 322, and RACH message 4 324.

RACH message 2 320 may be transmitted by the host UE 104a in response to the RACH preamble 318 to indicate resources to be used by the client UE 104b for sending RACH message 3 322 and for receiving RACH message 4 324. RACH message 3 322 may be transmitted by the client UE 104b and may include a control channel and a data channel providing identification information for the client UE 104b. RACH message 4 424 may set up a radio resource control (RRC) connection between the host UE 104a and the client UE 104b that may be used for further communications.

Figure 4:
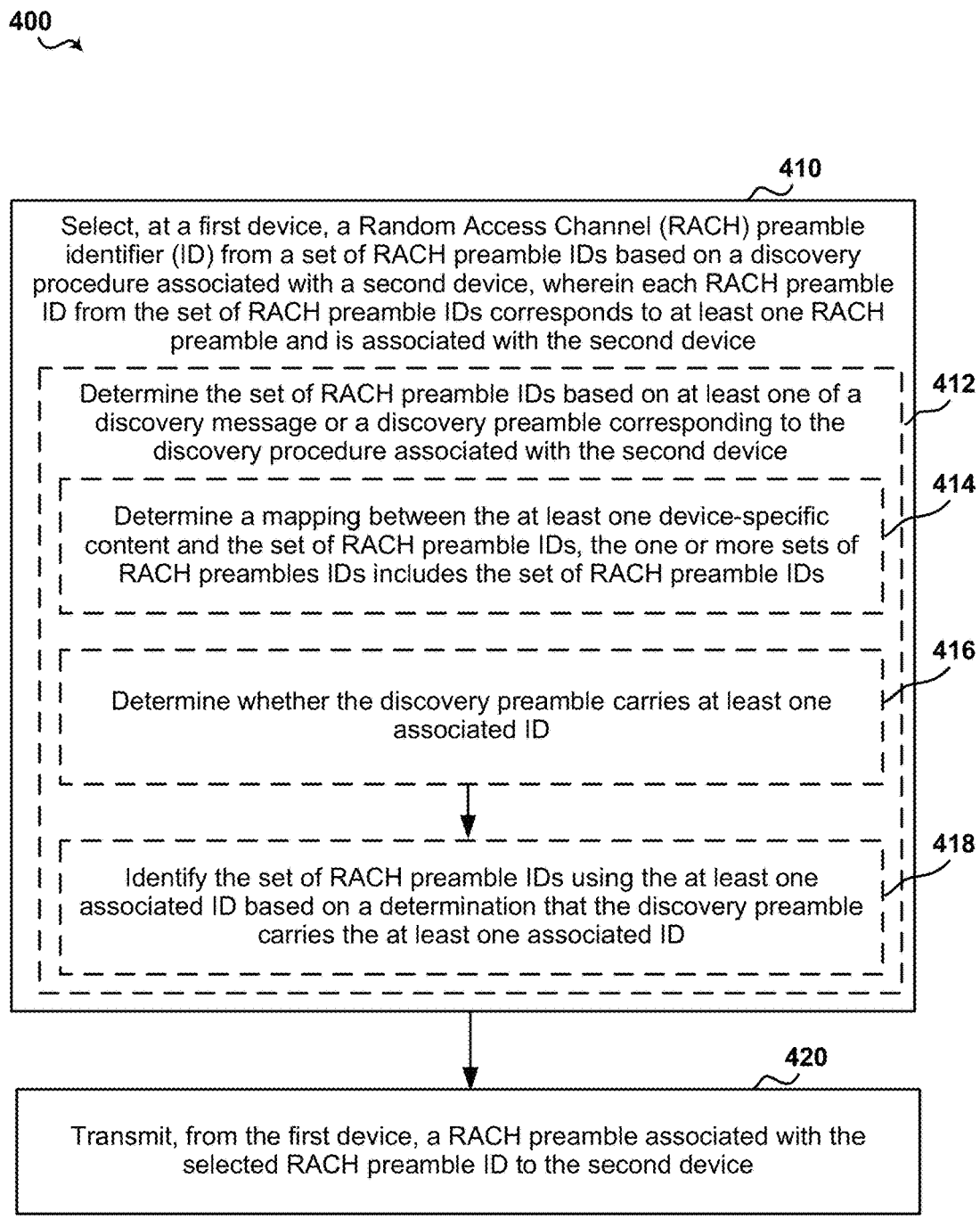
FIG. 4 is a flowchart of an example method of wireless communication by a client UE or base station.

FIG. 4 is a flowchart of a method 400 of wireless communication for a client UE 104b in a CV2X system. The method 400 may be performed by an apparatus such as the client access component 196 of the client UE 104b. Optional blocks are shown in dashed lines.

In block 410, the method 400 may include selecting, at a first device, a Random Access Channel (RACH) preamble identifier (ID) from a set of RACH preamble IDs based on a discovery procedure associated with a second device, wherein each RACH preamble ID from the set of RACH preamble IDs corresponds to at least one RACH preamble and is associated with the second device. In an aspect, for example, the client UE 104b and/or selection component 630 may select RACH preamble ID 636 from a set of RACH preamble IDs 622 based on a discovery procedure associated with host device 104a. Each RACH preamble ID from the set of RACH preamble IDs 622 corresponds to at least one RACH preamble and is associated with the host UE 104a.

In an aspect, block 410 may include the optional sub-block 412, which may include determining the set of RACH preamble IDs 622 based on at least one of a discovery message or a discovery preamble corresponding to the discovery procedure associated with the host device 104a. For example, the discovery message includes at least one indication corresponding to the set of RACH preamble IDs 622 associated with the host UE 104a. In an aspect, for example, the client UE 104b and/or selection component 630 may determine the set of RACH preamble IDs 622 based on at least one of a discovery message or a discovery preamble corresponding to the discovery procedure associated with the host device 104a.

In an aspect, the discovery message may include at least one device-specific content that is mapped to one or more sets of RACH preamble IDs, and the optional sub-block 412 may include the sub-block 414, which may include determining a mapping between the at least one device-specific content and the set of RACH preamble IDs 622, the one or more sets of RACH preambles IDs includes the set of RACH preamble IDs 622. For example, determining the mapping between the at least one device-specific content and the set of RACH preamble IDs 622 includes determining the mapping between the at least one device-specific content and the set of RACH preamble IDs 622 based on a pre-configured system specification. In some instances, the at least one device-specific content includes at least one of a device ID or a discovery preamble ID.

In an aspect, the optional sub-block 412 may include the optional sub-block 416, which may include determining whether the discovery preamble carries at least one associated ID. Further, in an aspect, the optional sub-block 412 may include the optional sub-block 418, which may include identifying the set of RACH preamble IDs 622 using the at least one associated ID based on a determination that the discovery preamble carries the at least one associated ID.

In block 420, the method 400 may include transmitting, from the first device, a RACH preamble associated with the selected RACH preamble ID to the second device. In an aspect, for example, client UE 104b and/or transceiver 602 (including one or more antennas 665) may be configured to transmit a RACH preamble 634 associated with the selected RACH preamble ID 636 to the host device 104a. In an example, the RACH preamble 634 associated with the selected RACH preamble ID 636 includes at least one of resource information indicating a configuration of resources for subsequent RACH messages between the client UE 104b and the host UE 104a. In some instances, the RACH preamble 634 associated with the selected RACH preamble ID 636 includes a scheduling indication corresponding to a one or more communication preferences of the client UE 104b. In an example, the one or more communication preferences include at least one of a master-slave configuration between the host UE 104a and the client UE 104b, scheduling of one or more subsequent RACH messages, a status indicating transmission of a second RACH message, or a status indicating scanning of the second RACH message.

Figure 5:
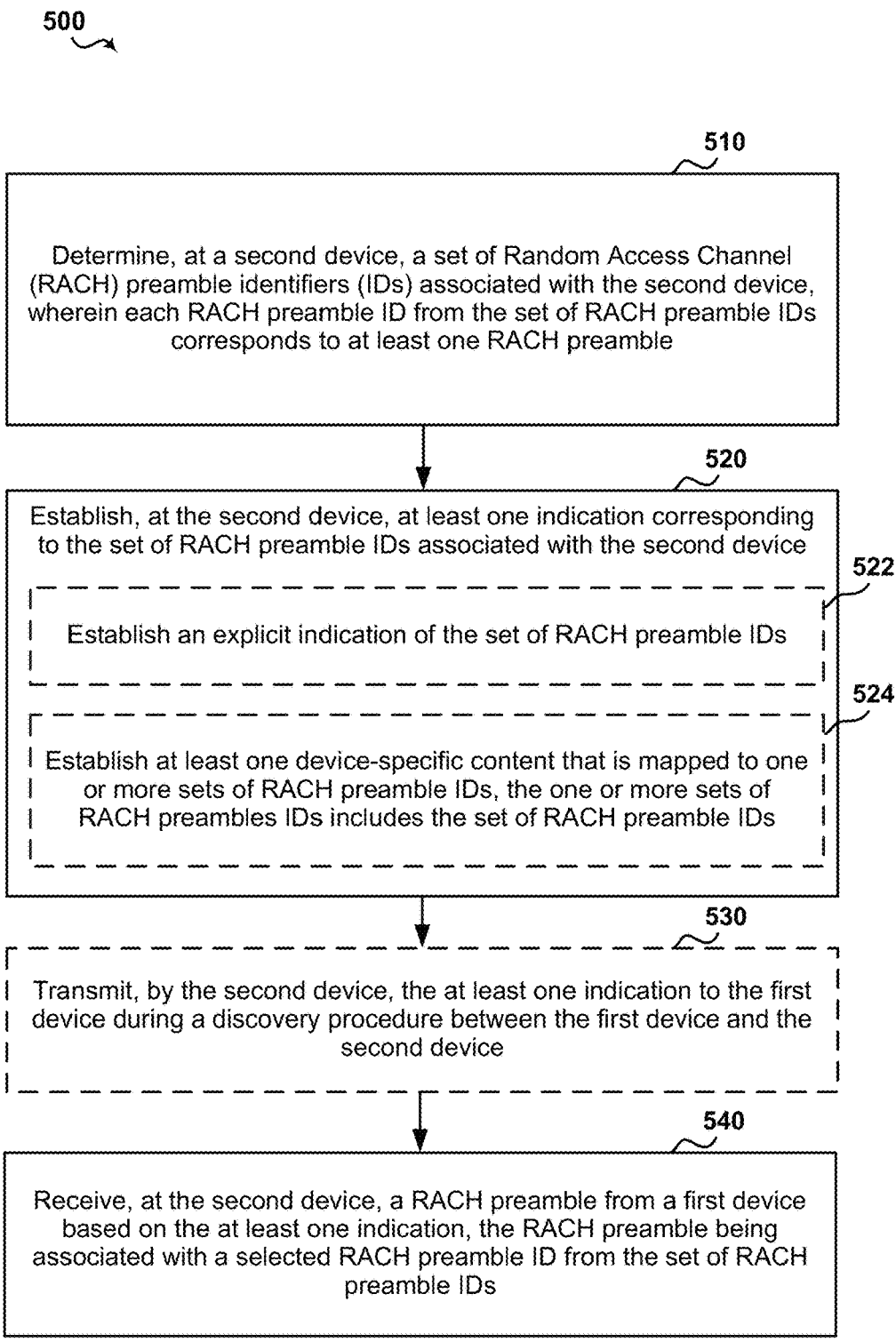
FIG. 5 is a flowchart of an example method of wireless communication by a host UE.

FIG. 5 is a flowchart of a method 500 of wireless communication for a host UE 104a or base station 102 in a CV2X system. The method 500 may be performed by an apparatus such as the host access component 194 in conjunction with the processor 612 of the host UE 104a or processor 712 of the base station 102. Optional blocks are shown in dashed lines.

At block 510, the method 500 may include determining, at a second device, a set of Random Access Channel (RACH) preamble identifiers (IDs) associated with the second device, wherein each RACH preamble ID from the set of RACH preamble IDs corresponds to at least one RACH preamble. In an aspect, for example, the host access component 194 may execute the determining component 620 to determine a set of RACH preamble IDs 622 associated with the host UE 104a. For example, each RACH preamble ID from the set of RACH preamble IDs 622 corresponds to at least one RACH preamble. In some instances, the determining component 620 may determine the set of RACH preamble IDs 622 associated with the host device 104a based on at least one of a plurality of measurements associated with the host device 104*a*, signaling received at the host device 104*a*, coordination between a group of host devices (e.g., including host device 104*a*) so that the set of RACH preamble IDs 622 may be non-overlapping among two or more host devices of the group of host devices (ensuring that a RACH preamble transmitted by a client device only triggers one host device), one or more indications received by the host device 104*a*, or a random preamble ID generator At block 520, the method 500 may include establishing, at the second device, at least one indication corresponding to the set of RACH preamble IDs associated with the second device. In an aspect, for example, the host access component 194 may execute establishing component 624 to establish at least one indication 626 corresponding to the set of RACH preamble IDs 622 associated with the host device 104*a*.

In an aspect, the block 520 may include the optional sub-block 522, which may include establishing an explicit indication of the set of RACH preamble IDs 622. In an aspect, for example, the host access component 194 may establish an explicit indication of the set of RACH preamble IDs 622.

In an aspect, the block 520 may include the optional sub-block 524, which may include establishing at least one device-specific content that is mapped to one or more sets of RACH preamble IDs. For example, the one or more sets of RACH preambles IDs includes the set of RACH preamble IDs 622. The at least one device-specific content includes at least one of a device ID or a discovery preamble ID.

At block 530, the method 500 may optionally include transmitting, by the second device, the at least one indication to the first device during a discovery procedure between the first device and the second device. In an aspect, for example, the host access component 194 may execute transceiver 602 to transmit the at least one indication 626 to the client UE 104*b* during a discovery procedure between the client UE 104*b* and the host UE 104*a*. In an example, the host access component 194 may execute transceiver 602 to transmit at least one of a discovery preamble or a discovery message to the client UE 104*b*. Either of the discovery preamble or the discovery message includes the at least one indication 626.

In block 540, the method 500 may include receive, at the second device, a RACH preamble from a first device based on the at least one indication, the RACH preamble being associated with a selected RACH preamble ID from the set of RACH preamble IDs. In an aspect, for example, the host access component 194 may execute transceiver 602 to receive a RACH preamble 634 from the client UE 104*b* based on the at least one indication 626. For example, the RACH preamble 634 is associated with a selected RACH preamble ID 636 from the set of RACH preamble IDs 622. In an example, the RACH preamble 634 associated with the selected RACH preamble ID 636 includes at least one of resource information indicating a configuration of resources for subsequent RACH messages between the client UE 104*b* and the host UE 104*a*. In some instances, the RACH preamble 634 associated with the selected RACH preamble ID 636 includes a scheduling indication corresponding to a one or more communication preferences of the client UE 104*b*. In an example, the one or more communication preferences include at least one of a master-slave configuration between the host UE 104*a* and the client UE 104*b*, scheduling of one or more subsequent RACH messages, a status indicating transmission of a second RACH message, or a status indicating scanning of the second RACH message.

Referring to FIG. 6, one example of an implementation of UE 104 may include a variety of components, some of which have already been described above, but including components such as one or more processors 612 and memory 616 and transceiver 602 in communication via one or more buses 644, which may operate in conjunction with modem 614, host access component 194 and client access component 196 to enable one or more of the functions described herein related to discovery procedures for CV2X Further, the one or more processors 612, modem 614, memory 616, transceiver 602, RF front end 688 and one or more antennas 665, may be configured to support voice and/or data calls (simultaneously or non-simultaneously) in one or more radio access technologies.

In an aspect, the one or more processors 612 may include a modem 614 that uses one or more modem processors. The various functions related to host access component 194 and client access component 196 may be included in modem 614 and/or processors 612 and, in an aspect, may be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with transceiver 602. In other aspects, some of the features of the one or more processors 612 and/or modem 614 associated with host access component 194 and client access component 196 may be performed by transceiver 602.

Also, memory 616 may be configured to store data used herein and/or local versions of applications 675, host access component 194, client access component 196 and/or one or more of subcomponents thereof being executed by at least one processor 612. Memory 616 may include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, memory 616 may be a non-transitory computer-readable storage medium that stores one or more computer-executable codes defining host access component 194, client access component 196 and/or one or more of subcomponents thereof, and/or data associated therewith, when UE 104 is operating at least one processor 612 to execute host access component 194 and client access component 196 and/or one or more subcomponents thereof.

Transceiver 602 may include at least one receiver 606 and at least one transmitter 608. Receiver 606 may include hardware, firmware, and/or software code executable by a processor for receiving data, the code comprising instructions and being stored in a memory (e.g., computer-readable medium). Receiver 606 may be, for example, a radio frequency (RF) receiver. In an aspect, receiver 606 may receive signals transmitted by at least one base station 102. Additionally, receiver 606 may process such received signals, and also may obtain measurements of the signals, such as, but not limited to, Ec/Io, SNR, RSRP, RSSI, etc. Transmitter 608 may include hardware, firmware, and/or software code executable by a processor for transmitting data, the code comprising instructions and being stored in a memory (e.g., computer-readable medium). A suitable example of transmitter 608 may including, but is not limited to, an RF transmitter.

Moreover, in an aspect, UE 104 may include RF front end 688, which may operate in communication with one or more antennas 665 and transceiver 602 for receiving and transmitting radio transmissions, for example, wireless communications transmitted by at least one base station 102 or wireless transmissions transmitted by UE 104. RF front end 688 may be connected to one or more antennas 665 and may include one or more low-noise amplifiers (LNAs) 690, one or more switches 692, one or more power amplifiers (PAs) 698, and one or more filters 696 for transmitting and receiving RF signals.

In an aspect, LNA 690 may amplify a received signal at a desired output level. In an aspect, each LNA 690 may have a specified minimum and maximum gain values. In an aspect, RF front end 688 may use one or more switches 692 to select a particular LNA 690 and its specified gain value based on a desired gain value for a particular application.

Further, for example, one or more PA(s) 698 may be used by RF front end 688 to amplify a signal for an RF output at a desired output power level. In an aspect, each PA 698 may have specified minimum and maximum gain values. In an aspect, RF front end 1088 may use one or more switches 692 to select a particular PA 698 and its specified gain value based on a desired gain value for a particular application.

Also, for example, one or more filters 696 may be used by RF front end 688 to filter a received signal to obtain an input RF signal. Similarly, in an aspect, for example, a respective filter 696 may be used to filter an output from a respective PA 698 to produce an output signal for transmission. In an aspect, each filter 696 may be connected to a specific LNA 690 and/or PA 698. In an aspect, RF front end 688 may use one or more switches 692 to select a transmit or receive path using a specified filter 696, LNA 690, and/or PA 698, based on a configuration as specified by transceiver 602 and/or processor 612.

As such, transceiver 602 may be configured to transmit and receive wireless signals through one or more antennas 665 via RF front end 688. In an aspect, transceiver may be tuned to operate at specified frequencies such that UE 104 may communicate with, for example, one or more base stations 102 or one or more cells associated with one or more base stations 102. In an aspect, for example, modem 614 may configure transceiver 602 to operate at a specified frequency and power level based on the UE configuration of the UE 104 and the communication protocol used by modem 614.

In an aspect, modem 614 may be a multiband-multimode modem, which may process digital data and communicate with transceiver 602 such that the digital data is sent and received using transceiver 602. In an aspect, modem 614 may be multiband and be configured to support multiple frequency bands for a specific communications protocol. In an aspect, modem 614 may be multimode and be configured to support multiple operating networks and communications protocols. In an aspect, modem 614 may control one or more components of UE 104 (e.g., RF front end 688, transceiver 602) to enable transmission and/or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection and/or cell reselection.

Referring to FIG. 7, one example of an implementation of base station 102 may include a variety of components, some of which have already been described above, but including components such as one or more processors 712 and memory 716 and transceiver 702 in communication via one or more buses 744, which may operate in conjunction with modem 714 and host access component 194 to enable one or more of the functions described herein related to CV2X discovery procedures.

The transceiver 702, receiver 706, transmitter 708, one or more processors 712, memory 716, applications 675, buses 744, RF front end 788, LNAs 790, switches 792, filters 796, PAs 798, and one or more antennas 765 may be the same as or similar to the corresponding components of UE 104, as described above, but configured or otherwise programmed for base station operations as opposed to UE operations.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communications at a first device, comprising:
 selecting a Random Access Channel (RACH) preamble identifier (ID) from a set of RACH preamble IDs based on a discovery procedure occurring between the first device and a second device prior to initiating an access procedure, each RACH preamble ID from the set of RACH preamble IDs corresponding to at least one RACH preamble and is associated with the second device, wherein selecting the RACH preamble ID from the set of RACH preamble IDs further comprises determining the set of RACH preamble IDs based on at least one of a discovery message or a discovery preamble corresponding to the discovery procedure associated with the second device; and transmitting a RACH preamble associated with the selected RACH preamble ID to the second device.

2. The method of claim 1, wherein the discovery message includes at least one indication corresponding to the set of RACH preamble IDs associated with the second device.

3. The method of claim 1, wherein the discovery message includes at least one device-specific content that is mapped to one or more sets of RACH preamble IDs; and wherein selecting the RACH preamble ID from the set of RACH preamble IDs includes determining a mapping between the at least one device-specific content and the set of RACH preamble IDs, the one or more sets of RACH preambles IDs includes the set of RACH preamble IDs.

4. The method of claim 3, wherein determining the mapping between the at least one device-specific content and the set of RACH preamble IDs includes determining the mapping between the at least one device-specific content and the set of RACH preamble IDs based on a pre-configured system specification.

5. The method of claim 3, wherein the at least one device-specific content includes at least one of a device ID or a discovery preamble ID.

6. The method of claim 1, wherein selecting the RACH preamble ID from the set of RACH preamble IDs includes:

determining whether the discovery preamble carries at least one associated ID; and identifying the set of RACH preamble IDs using the at least one associated ID based on a determination that the discovery preamble carries the at least one associated ID.

7. The method of claim 1, wherein the RACH preamble associated with the selected RACH preamble ID carries at least one of resource information indicating a configuration of resources for subsequent RACH messages between the first device and the second device.

8. The method of claim 1, wherein the RACH preamble associated with the selected RACH preamble ID carries a scheduling indication corresponding to a one or more communication preferences of the first device.

9. The method of claim 8, wherein the one or more communication preferences carries at least one of a master-slave configuration between the first device and the second device, scheduling of one or more subsequent RACH messages, a status indicating an intention of whether to transmit or scan for a second RACH message.

10. The method of claim 1, further comprising receiving the discovery preamble from the second device during the discovery procedure, the discovery preamble indicating a capability of the second device of engaging in communication with the first device.

11. The method of claim 10, further comprising transmitting a query to the second device in response to receiving the discovery preamble during the discovery procedure, the query indicating an interest of the first device to receiving additional information from the second device.

12. The method of claim 11, further comprising receiving the discovery message from the second device in response to transmitting the query during the discovery procedure between the first device and the second device.

13. A method of wireless communications at a second device, comprising:

determining a set of Random Access Channel (RACH) preamble identifiers (IDs) associated with the second device, each RACH preamble ID from the set of RACH preamble IDs corresponding to at least one RACH preamble, wherein determining the set of RACH preamble IDs associated with the second device includes determining the set of RACH preamble IDs associated with the second device based on at least one of a plurality of measurements associated with the second device, signaling received at the second device, coordination between a group of host devices including the second device, one or more indications received by the second device, or a random preamble ID generator;

establishing at least one indication corresponding to the set of RACH preamble IDs associated with the second device;

transmitting the at least one indication to a first device during a discovery procedure between the first device and the second device, wherein the discovery procedure occurs between the first device and the second device prior to initiating an access procedure; and receiving a RACH preamble from the first device based on the at least one indication, the RACH preamble being associated with a selected RACH preamble ID from the set of RACH preamble IDs.

14. The method of claim 13, wherein transmitting the at least one indication to the first device during the discovery procedure includes transmitting, by the second device, at least one of a discovery preamble or a discovery message to the first device, wherein either of the discovery preamble or the discovery message includes the at least one indication.

15. The method of claim 13, wherein establishing the at least one indication corresponding to the set of RACH preamble IDs associated with the second device includes establishing an explicit indication of the set of RACH preamble IDs.

16. The method of claim 13, wherein establishing the at least one indication corresponding to the set of RACH preamble IDs associated with the second device includes establishing at least one device-specific content that is mapped to one or more sets of RACH preamble IDs, the one or more sets of RACH preambles IDs includes the set of RACH preamble IDs.

17. The method of claim 16, wherein the at least one device-specific content includes at least one of a device ID or a discovery preamble ID.

18. The method of claim 13, wherein the RACH preamble associated with the selected RACH preamble ID carries at least one of resource information indicating a configuration of resources for subsequent RACH messages between the first device and the second device.

19. The method of claim 13, wherein the RACH preamble associated with the selected RACH preamble ID carries a scheduling indication corresponding to a one or more communication preferences of the first device.

20. The method of claim 19, wherein the one or more communication preferences carries at least one of a master-slave configuration between the first device and the second device, scheduling of one or more subsequent RACH messages, a status indicating an intention of whether to transmit or scan for the second RACH message.

21. An apparatus for wireless communications at a first device, comprising:

a memory; and a processor coupled with the memory and configured to:

select a Random Access Channel (RACH) preamble identifier (ID) from a set of RACH preamble IDs based on a discovery procedure occurring between the first device and a second device prior to initiating an access procedure, each RACH preamble ID from the set of RACH preamble IDs corresponding to at least one RACH preamble and is associated with the second device, wherein the processor configured to select the RACH preamble ID from the set of RACH preamble IDs further determines the set of RACH preamble IDs based on at least one of a discovery message or a discovery preamble corresponding to the discovery procedure associated with the second device; and transmit a RACH preamble associated with the selected RACH preamble ID to the second device.

22. The apparatus of claim 21, wherein the discovery message includes at least one indication corresponding to the set of RACH preamble IDs associated with the second device.

23. The apparatus of claim 21, wherein the discovery message includes at least one device-specific content that is mapped to one or more sets of RACH preamble IDs; and wherein the processor configured to select the RACH preamble ID from the set of RACH preamble IDs further determines a mapping between the at least one device-specific content and the set of RACH preamble IDs, the one or more sets of RACH preambles IDs includes the set of RACH preamble IDs, wherein the processor configured to determine the mapping between the at least one device-specific content and the set of RACH preamble IDs further determines the mapping between the at least one device-specific content and the set of RACH preamble IDs based on a pre-configured system specification, and wherein the at least one device-specific content includes at least one of a device ID or a discovery preamble ID.

24. The apparatus of claim 21, wherein the processor configured to select the RACH preamble ID from the set of RACH preamble IDs further:

determines whether the discovery preamble carries at least one associated ID; and identifies the set of RACH preamble IDs using the at least one associated ID based on a determination that the discovery preamble carries the at least one associated ID.

25. The apparatus of claim 21, wherein the processor is configured to:

receive the discovery preamble from the second device during the discovery procedure, the discovery preamble indicating a capability of the second device of engaging in communication with the first device; and transmit a query to the second device in response to receiving the discovery preamble during the discovery procedure, the query indicating an interest of the first device to receiving additional information from the second device.

26. The apparatus of claim 25, wherein the processor is configured to receive the discovery message from the second device in response to transmitting the query during the discovery procedure between the first device and the second device.

27. An apparatus for wireless communications at a second device, comprising:

a memory; and a processor coupled with the memory and configured to:
determine a set of Random Access Channel (RACH) preamble identifiers (IDs) associated with the second device, each RACH preamble ID from the set of RACH preamble IDs corresponding to at least one RACH preamble, wherein processor configured to determine the set of RACH preamble IDs associated with the second device further determines the set of RACH preamble IDs associated with the second device based on at least one of a plurality of measurements associated with the second device, signaling received at the second device, coordination between a group of host devices including the second device, one or more indications received by the second device, or a random preamble ID generator;

establish at least one indication corresponding to the set of RACH preamble IDs associated with the second device;

transmit the at least one indication to the first device during a discovery procedure between the first device and the second device, wherein the discovery procedure occurs between the first device and the second device prior to initiating an access procedure; and receive a RACH preamble from a first device based on the at least one indication, the RACH preamble being associated with a selected RACH preamble ID from the set of RACH preamble IDs.

28. The apparatus of claim 27, wherein the processor configured to transmit the at least one indication to the first device during the discovery procedure includes further transmits at least one of a discovery preamble or a discovery message to the first device, wherein either of the discovery preamble or the discovery message includes the at least one indication.

29. The apparatus of claim 27, wherein the processor configured to establish the at least one indication corresponding to the set of RACH preamble IDs associated with the second device further establishes an explicit indication of the set of RACH preamble IDs.

30. The apparatus of claim 27, wherein the processor configured to establish the at least one indication corresponding to the set of RACH preamble IDs associated with the second device further establishes at least one device-specific content that is mapped to one or more sets of RACH preamble IDs, the one or more sets of RACH preambles IDs includes the set of RACH preamble IDs, and wherein the at least one device-specific content includes at least one of a device ID or a discovery preamble ID.

* * * * *